United States Patent [19]
Benjamin

[11] Patent Number: 5,721,573
[45] Date of Patent: Feb. 24, 1998

[54] COOLDOWN TIMING SYSTEM MONITORS INKJET CARTRIDGE INK LEVELS

[75] Inventor: Trudy L. Benjamin, Vancouver, Wash.

[73] Assignee: Hewlett-Packard Company, Palo Alto, Calif.

[21] Appl. No.: 449,163

[22] Filed: May 24, 1995

[51] Int. Cl.⁶ .................................................. B41J 2/195
[52] U.S. Cl. ........................................ 347/7; 347/19
[58] Field of Search ........................... 347/5, 7, 17, 19, 347/85, 87; 73/1 H, 290 R, 302; 340/622

[56] References Cited

U.S. PATENT DOCUMENTS

| | | | |
|---|---|---|---|
| 4,326,199 | 4/1982 | Tarpley et al. | 340/622 |
| 4,683,481 | 7/1987 | Johnson | 347/65 |
| 4,935,751 | 6/1990 | Hamlin | 347/86 |
| 4,940,997 | 7/1990 | Hamlin et al. | 347/87 |
| 4,973,993 | 11/1990 | Allen | 347/7 |
| 5,079,570 | 1/1992 | Mohr et al. | 347/7 |
| 5,136,305 | 8/1992 | Ims | 347/7 |
| 5,206,668 | 4/1993 | Lo et al. | 347/6 |
| 5,278,584 | 1/1994 | Keefe et al. | 347/63 |
| 5,289,211 | 2/1994 | Morandotti et al. | 347/7 |
| 5,315,316 | 5/1994 | Khormaee | 347/3 |
| 5,406,315 | 4/1995 | Allen et al. | 347/7 |
| 5,528,269 | 6/1996 | Drogo et al. | 347/19 |
| 5,574,484 | 11/1996 | Cowger | 347/7 |
| 5,583,545 | 12/1996 | Pawlowski, Jr. et al. | 347/7 |

FOREIGN PATENT DOCUMENTS

| | | | |
|---|---|---|---|
| 0444861A2 | 9/1991 | European Pat. Off. | B41J 2/175 |
| 22772789 | 6/1995 | European Pat. Off. | |

*Primary Examiner*—N. Le
*Assistant Examiner*—L. Anderson
*Attorney, Agent, or Firm*—Flory L. Martin

[57] ABSTRACT

An inkjet cartridge cooldown time system is used to monitor the ink level remaining in the cartridge to provide an early warning before the cartridge is completely empty, so the cartridge may be either refilled or replaced. An ink level monitoring method selects first and second cartridge temperatures. Then the cartridge is paused during a printing operation, such as during a form feed, to measure the cooldown time required for the cartridge to transition from the first temperature to the second temperature. The measuring step is repeated to compile a set of cooldown times. In a signaling step, the operator is alerted of the approach of an out of ink condition when a cooldown time has increased a selected value, such as at least 20%, over the compiled set of cooldown times. An inkjet printing mechanism is also equipped for using this method to monitor ink levels.

20 Claims, 4 Drawing Sheets

5,721,573

COOLDOWN TIMING SYSTEM MONITORS INKJET CARTRIDGE INK LEVELS

FIELD OF THE INVENTION

The present invention relates generally to inkjet printing mechanisms, and more particularly to an ink level monitoring system that provides an early warning before an inkjet cartridge is completely empty.

BACKGROUND OF THE INVENTION

Inkjet printing mechanisms use cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which humidically seals the printhead nozzles from contaminants and drying. Some caps are also designed to facilitate priming, such as by being connected to a pumping unit that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

To improve the clarity and contrast of the printed image, recent research has focused on improving the ink itself. To provide faster, more waterfast printing with darker blacks and more vivid colors, pigment based inks have been developed. These pigment based inks have a higher solid content than the earlier dye based inks, which results in a higher optical density for the new inks. Both types of ink dry quickly, which allows inkjet printing mechanisms to use plain paper. Unfortunately, the combination of small nozzles and quick drying ink leaves the printheads susceptible to clogging, not only from dried ink and minute dust particles or paper fibers, but also from the solids within the new inks themselves. Partially or completely blocked nozzles can lead to either missing or misdirected drops on the print media, either of which degrades the print quality. Spitting to clear the nozzles becomes even more important when using pigment based inks, because the higher solids content contributes to the clogging problem more than the earlier dye based inks. Typically, the spittoon must be designed to contain the waste ink over the lifetime of the printing mechanism.

To maintain reliability of the inkjet printing mechanism during operation, it is helpful to have advanced warning for an operator as to when the ink level in a cartridge is getting low. This allows an operator to either refill the current cartridge or procure a fresh inkjet cartridge before the one in use is completely empty. If the cartridge is refillable, an early warning would allow an operator to replenish the ink supply before the pen is dry-fired. Dry-firing an inkjet cartridge when empty may permanently damage the printhead.

A variety of solutions have been proposed for monitoring the level of ink within inkjet cartridges. For example, several mechanical devices have been proposed to determine when the ink supply falls below a predetermined level. One system uses a ball check valve within an ink bag to interrupts ink flow when the pen is nearly empty. Unfortunately, this system has no early warning capability.

Several more sophisticated detection systems have been devised, based upon temperature changes from spitting specific mounts of ink into the spittoon. Unfortunately, these systems all waste ink and unnecessarily fill the spittoon. One system detects ink level by sensing the temperature of the printhead substrate as a test pattern is fired into the spittoon. This method generates a ratio by comparing changes in temperature from printing different potions of this test pattern. When the ratio exceeds a known value, a signal is sent to alert an operator and printing is stopped. In a related system, a history of printhead temperature change is compiled, so ink flow is determined not only from the rate of temperature changes while firing the test pattern, but also from the change in the thermal history of the printhead.

Another out-of-ink detector system uses warming pulses to heat the cartridge to a higher temperature than its normal operating temperature. Following this prewarming, the cartridge firing pulses then eject ink into the spittoon and the temperature is sampled during firing to produce a set of temperature values. If the cartridge is ejecting a normal or nearly normal amount of ink, the temperature will decrease as the ink is ejected. However, if the cartridge is ejecting less than its normal amount of ink, this rate of temperature decrease will be less, or the temperature will stay the same or even increase. That is, in a graph of the rate of temperature decrease, the slope of the rate will change from the normal ink level slope as lesser amounts of ink are ejected.

Another ink level monitoring system claims that ink drop volume falls at a faster rate as the ink supply diminishes when firing at higher frequency rates than when firing at lower frequency rates. In this system, the cartridge is warmed to a predetermined temperature and then fired at a first frequency to eject a specified volume of ink. After this fast firing sequence, a cooler volume of ink is conveyed to the printhead to replace the ejected ink volume, and the temperature change is monitored. The process is then repeated at a second firing frequency to determine a second temperature change. The first and second temperature changes are then compared to determine the remaining ink level.

Another system for detecting the level of ink tracks printhead usage and then stores the count in a memory element. When certain usage levels are detected, the printer drives certain resistors mounted on the printhead to an open circuit (burned out) condition. The number of burned out resistors are used to alert the operator of the ink level.

All of the above ink detection methods suffer one or more drawbacks. For example, some systems fail to provide an early warning system, and abruptly interrupt a printing job at a certain ink level. Other systems compare temperature changes after spitting specified amounts of ink, which unfortunately wastes ink. This ink is "wasted" because, 1) it is not used for printing, and 2) it is not required for purging clogs from the printhead nozzles. Furthermore, this wasted ink must be contained within the printing mechanism and spittoon area. During the lifetime of the printing mechanism, this waste ink accumulation can become a real nuisance.

SUMMARY OF THE INVENTION

One aspect of the present invention addresses the ink level detection problem by providing a method of monitoring the ink level remaining in an inkjet cartridge installed in an inkjet printing mechanism. This method includes the steps of selecting first and second temperatures of the cartridge and pausing the inkjet cartridge during a printing operation. During the pausing step, the cooldown time required for the cartridge to transition from the first temperature to the second temperature is measured. The measuring step is repeated to compile a set of cooldown times. In a signaling step, the operator is alerted of the approach of an out of ink condition when a cooldown time has increased a selected value over the compiled set of cooldown times.

According to another aspect of the invention, an inkjet printing mechanism is provided for printing with an inkjet cartridge. The mechanism has a moveable carriage to receive the inkjet cartridge, and a temperature sensor to collect information about the cartridge temperature. The printing mechanism also has a controller that is responsive to the temperature sensor to measure a cooldown time required for the cartridge to transition between selected first and second temperatures, and to compile therefrom a set of cooldown times from subsequent measurements. The mechanism also has a signal device responsive to the controller to alert an operator of the approach of an out of ink condition when a cooldown time has increased a selected value over the compiled set of cooldown times.

An overall goal of the present invention is to provide an inkjet printing mechanism which is reliable and gives an early warning before an inkjet cartridge is completely empty, allowing an operator to refill or replace the cartridge.

A further goal of the present invention is to provide a method of monitoring ink levels within an inkjet cartridge which is fast and accurate.

Another object of the present invention is to provide an inkjet cartridge level monitoring system which does not unnecessarily waste ink.

DETAILED DESCRIPTION OF THE PREFERRED EMBODIMENTS

Figure 1:
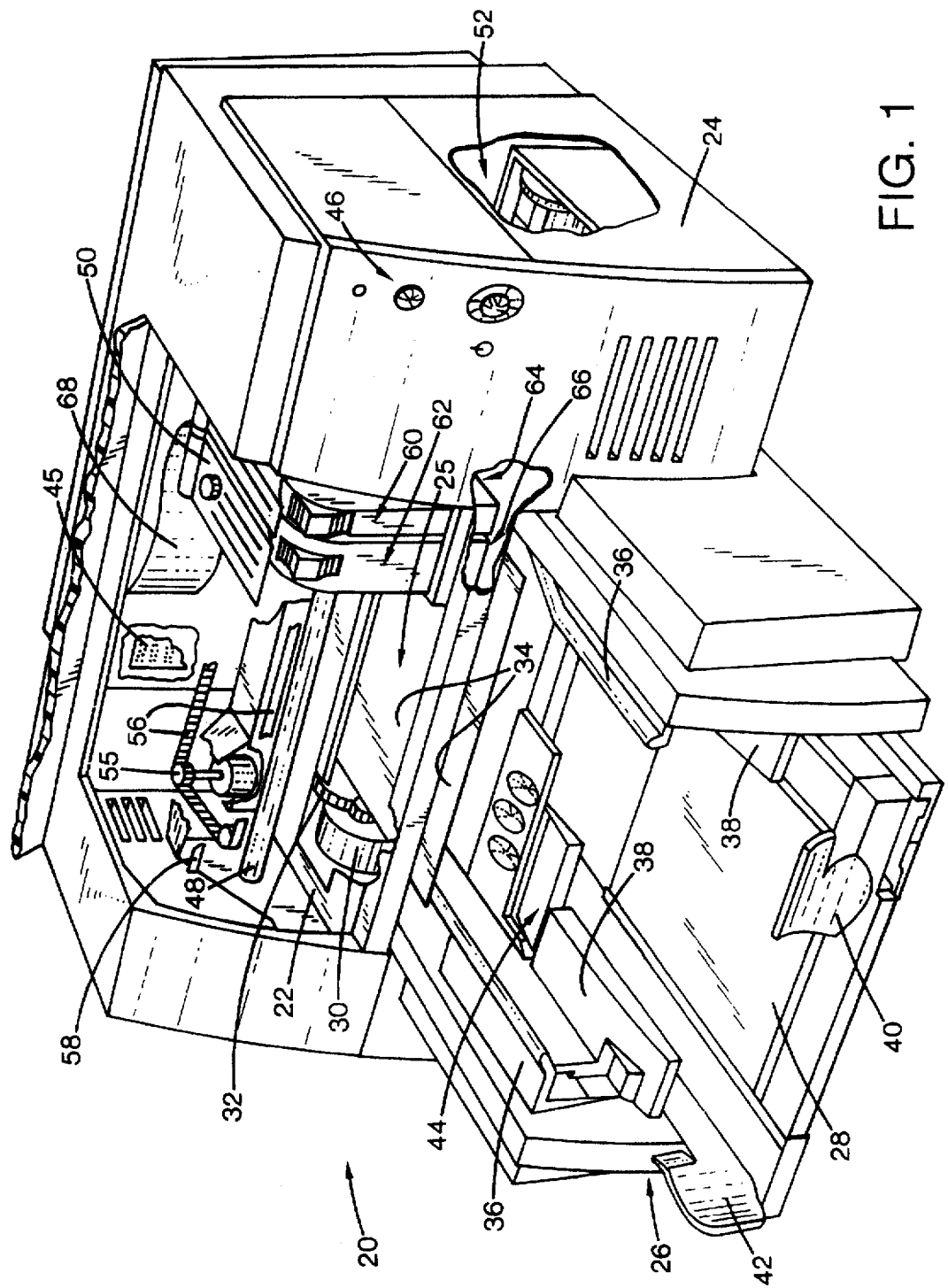
FIG. 1 is a fragmented, partially schematic, perspective view of one form of an inkjet printing mechanism employing a cooldown time monitoring system of the present invention for determining ink levels within an inkjet cartridge.

FIG. 1 illustrates an embodiment of an inkjet printing mechanism, here shown as an inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20.

While it is apparent that the printer components may vary from model to model, the typical inkjet printer 20 includes a chassis 22 surrounded by a housing or casing enclosure 24, typically of a plastic material. Sheets of print media are fed through a print zone 25 by a print media handling system 26. The print media may be any type of suitable sheet material, such as paper, card-stock, transparencies, mylar, and the like, but for convenience, the illustrated embodiment is described using paper as the print medium. The print media handling system 26 has a feed tray 28 for storing sheets of paper before printing. A series of conventional paper drive rollers (not shown), driven by a stepper motor 30 and a drive gear assembly 32, may be used to move the print media from tray 28 into the print zone 25, as shown for sheet 34, for printing. After printing, the motor 30 drives the printed sheet 34 onto a pair of retractable output drying wing members 36. The wings 36 momentarily hold the newly printed sheet above any previously printed sheets still drying in an output tray portion 38 before retracting to the sides to drop the newly printed sheet into the output tray 38. The media handling system 26 may include a series of adjustment mechanisms for accommodating different sizes of print media, including letter, legal, A-4, envelopes, etc., such as a sliding length adjustment lever 40, a sliding width adjustment lever 42, and a sliding envelope feed plate 44.

The printer 20 also has a printer controller, illustrated schematically as a microprocessor 45, that receives instructions from a host device, typically a computer, such as a personal computer (not shown). The printer controller 45 may also operate in response to user inputs provided through a key pad 46 located on the exterior of the casing 24. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 48 is supported by the chassis 22 to slideably support an inkjet carriage 50 for travel back and forth across the print zone 25. One suitable type of carriage support system is shown in U.S. Pat. No. 5,366,305, assigned to Hewlett-Packard Company, the assignee of the present invention. The carriage 50 is also propelled along guide rod 48 into a servicing region housing a service station, as indicated generally by arrow 52, located within the interior of the casing 24. A carriage drive gear and DC motor assembly 55 is coupled to drive an endless belt 56. The motor 55 operates in response to control signals received from the printer controller 45. The belt 56 may be secured in a conventional manner to the pen carriage 50 to incrementally advance the carriage along guide rod 48 in response to rotation of motor 55.

To provide carriage positional feedback information to printer controller 45, an encoder strip 58 extends along the length of the print zone 25 and over the service station area 52. A conventional optical encoder reader may also be mounted on the back surface of printhead carriage 50 to read positional information provided by the encoder strip 58. The manner of attaching the belt 56 to the carriage, as well as the manner providing positional feedback information via the encoder strip reader, may be accomplished in a variety of different ways known to those skilled in the art.

In the print zone 25, the media sheet 34 receives ink from an inkjet cartridge, such as a black ink cartridge 60 and/or a color ink cartridge 62. The cartridges 60 and 62 are also often called "pens" by those in the art. The illustrated color pen 62 is a tri-color pen, although in some embodiments, a set of discrete monochrome pens may be used. While the color pen 62 may contain a pigment based ink, for the purposes of illustration, pen 62 is described as containing three dye based ink colors, such as cyan, yellow and magenta. The black ink pen 60 is illustrated herein as containing a pigment based ink. It is apparent that other types of inks may also be used in pens 60, 62, such as paraffin based inks, as well as hybrid or composite inks having both dye and pigment characteristics.

The illustrated pens 60, 62 each include reservoirs for storing a supply of ink. The pens 60, 62 have printheads 64, 66 respectively, each of which have an orifice plate with a plurality of nozzles formed therethrough in a manner well known to those skilled in the art. The illustrated printheads 64, 66 are thermal inkjet printheads, although other types of printheads may be used, such as piezoelectric printheads. The printheads 64, 66 typically include substrate layer having a plurality of resistors which are associated with the nozzles. Upon energizing a selected resistor, a bubble of gas is formed to eject a droplet of ink from the nozzle and onto sheet 34 in the print zone 25. Ink may also be ejected into a spittoon portion of the service station 52 during servicing, or to clear plugged nozzles. The printhead resistors are selectively energized in response to ruing command control signals delivered by a multi-conductor strip 68 from the controller 45 to the printhead carriage 50.

Cooldown Timing System

In forming the resistors within the printheads 64, 66, a conventional temperature measuring device or sensor may be formed to be contained within the printhead. For example, these on-board temperature sensors may be included within the printhead substrate an additional resistive trace, formed in a conventional manner known to those skilled in the art. In accordance with the present invention, the signals generated by these resistive traces convey temperature information, which is collected by the printer controller 45. This cartridge temperature information is used to monitor the cooldown time after printing, and/or during line feeds while the printhead 64, 66 is idle waiting for the paper 34 to be incremented through the printer by the print handling system 26.

Two temperatures are selected, and the amount of time required for the pen to cool to the lower temperature is monitored. Preferably, the second lower temperature of the cartridge is greater than an ambient temperature within which the printer 20 operates. It is also apparent that the cooldown temperatures may be selected based on an actual printer operating temperature, which may vary depending upon the amount of use, the environmental location of the printer, etc.

The selected cooldown time values may be stored in a conventional memory device in the printer controller 45 to compile a set of cartridge cooldown times. As this cooldown time increases, then an out-of-ink condition is approaching. For instance, tests showed reliable predictions of nearing empty occurred at an increase of at least 20% over the original cooldown values compiled when the pen was new. It is apparent that other threshold values may be empirically selected in accordance with the present invention depending upon the particular cartridge and printing mechanism implemented. As the selected time increase is reached, the printer controller 45 generates a signal and sends it to the host computer, for instance, or to the printer control panel 46, so that the pen may be refilled or a fresh ink cartridge may be procured before the remaining ink supply is exhausted.

Figure 2:
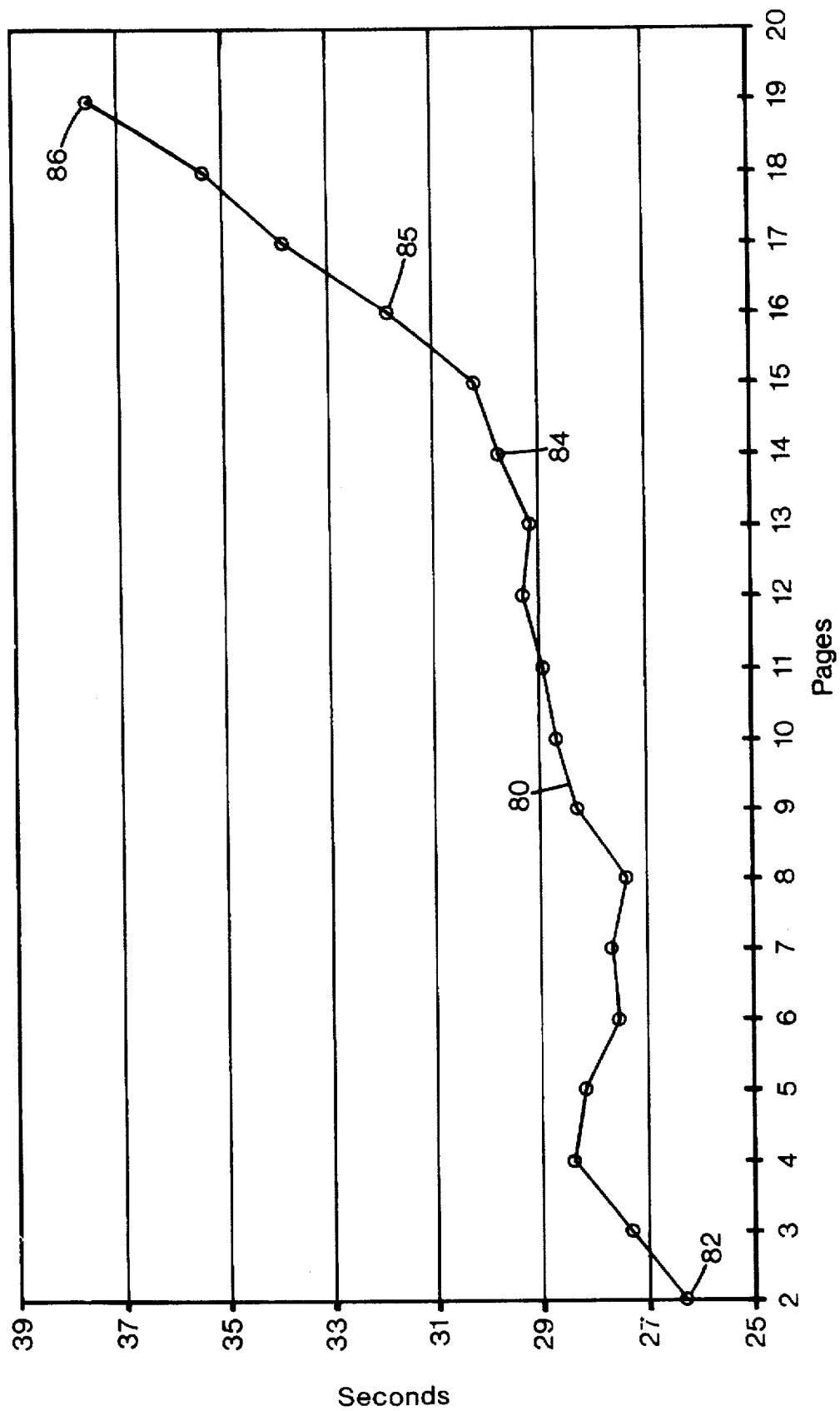
FIGS. 2 and 3 are graphs illustrating two different embodiments of the cooldown time monitoring system of FIG. 1.
Figure 3:
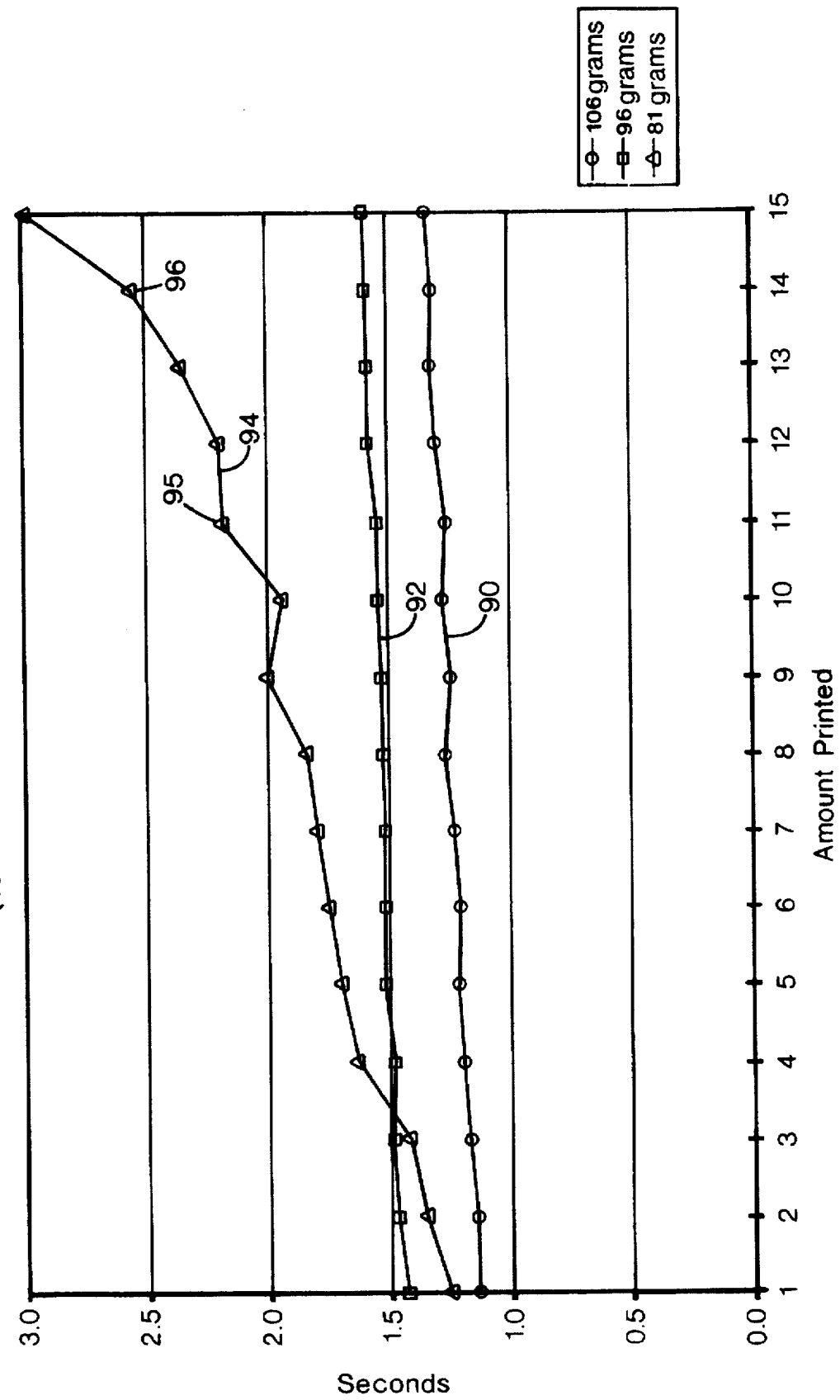

Another of the earlier systems described in the background portion above measures two effects during printing, 1) being the beating of the pen because less heat is being dissipated as the ink levels decrease, and 2) lack of cool ink. In the present system, both the heating of the pen by firing and the cooldown time are monitored. In the present method, measuring the cooldown time provides an earlier and stronger signal than measuring merely the final temperature rise. That is, monitoring the cooldown time provides a very fast and early indication of an approaching out-of-ink condition. FIGS. 2 and 3 are graphs used to illustrate the concepts and validity of the present method.

For example, referring to the graph of FIG. 2, the cooldown time from 45° C. to 35° C. is illustrated after printing a group of totally black pages with the black cartridge 60. The temperatures selected may correspond to a convenient range, such as a 15-30% temperature decrease, with the illustrated example of FIG. 2 showing the cooldown times for a 22% decrease. The cooldown times measured varied from around 26-29 seconds initially until after printing the 14th page, when the cooldown time had gradually risen to around 30 seconds. At this 14th page time, it was noticed that print quality was beginning to decrease, specifically, three dots were shown missing from the 14th page. The cooldown time then began to increase, to around 32 seconds after printing the 16th page, where it was first determined that the pen was indeed beginning to run out of ink. The amount of time for cooldown from 45° to 35° C. increased to a peak of nearly 38 seconds after printing the 19th page.

FIG. 3 illustrates a second method of ink level monitoring in accordance with the present invention. In this embodiment, test pages were printed with a 35% area fill, which is probably more typical of textual and graphics printing, than the full black page used to compile the data in FIG. 2. In FIG. 3, the two temperatures selected were an initial temperature of 43.85° C., and a cooled-down temperature of 41.39° C., which corresponds to an approximate 10% temperature decrease, although other percentages may be used. These temperatures were selected as a convenient measuring point based upon the resolution of the particular analog to digital (A-to-D) converter employed during testing. It is apparent that a faster range (temperatures closer together) may be selected by varying the components used, for example, by using a more sensitive A-to-D converter and other electronic components within the printer controller 45 for a given implementation of the invention.

The temperatures of FIG. 3 were selected to conveniently accomplish monitoring while pausing the printhead carriage 50 during a printing operation, such as during a form feed step. For instance, in the illustrated printer 20, the amount of time required for a form feed to expel a printed sheet onto the output way wings 36, and load a fresh sheet from the input way 28 to the printzone 25, is about two seconds. So the cooldown temperatures were selected to generate cooldown times within about two seconds so monitoring may be accomplished while the pen is in a non-printing mode anyway, so no printing time is lost during the monitoring. Alternatively, of course, the cooldown time may also be monitored during a scheduled test, such as when a test pattern is spit into the spittoon, which may make the system more robust in some implementations.

In FIG. 3, the three lines represent varying pen weights, that is different levels of ink fill, at the start of the print cycle as a black pen 60 was being emptied. For convenience, the total pen weight, not just the ink, was recorded. At the beginning of the test cycle, the pen weighed 106 grams, with the cooldown lines being shown by curve 90. At the beginning of the second cycle, the pen weighed 96 grams, and the cooldown times are recorded as curve 92. At the beginning and intermediate portion of the pen's life, the cooldown times showed very gradual increases in over the 15 page print cycle, with cycle rising approximately 0.2 seconds from the first to the fifteenth page.

Beginning the last cycle of the test pen's life, with the total pen weight down to 81 grams, the pen cooldown time is shown in FIG. 3 as curve 94. After printing the 11th page, at point 95, the fast indication of an out-of-ink condition was noted by detecting three dots missing. After printing the 14th page, at point 96 on curve 94, the out-of-ink condition was indeed visible within the textual matter printed. By using a much smaller temperature drop than in FIG. 2, here on the order of approximately a 10% drop, a cooldown time of approximately two seconds (rather than 30 seconds for FIG. 2) may be used as a first indication of an eminent out-of-ink condition approaching. The controller 45 then signals the operator of this condition. While an operator may continue printing with a pen which is approaching an out-of-ink condition, if high quality printing is required an operator may decide to either refill the cartridge or replace it with a fresh cartridge. Alternatively, if print quality is not of concern an operator may continue printing with some degradation in ink quality until the pen no longer prints. It should be noted that the printhead may be damaged by dry-firing (firing when empty), so the early warning is particularly useful when a refillable inkjet cartridge is used.

Another factor affecting the cooldown time may be the print density level of a particular page. For example, a sheet of text typically has a 7% area of fill, or print density. Printing with higher density levels is believed to increase the printhead temperature because the nozzles are firing more frequently to eject ink. Thus, it may be helpful to compile an initial set of cooldown times for several different print density levels as they are encountered during use. Having a set of cooldown times compiled for each two-fold increase in fill area may be useful, for instance at the text level of 7%, then at 15%, 30%, and 60% up to full black (100% fill) print densities, for a total of five density levels. Of come, other cut-off points, or other numbers of levels may be implemented.

Preferably, the step of monitoring cooldown time is performed on a regular basis after certain intervals, such as during a form feed in the illustrated embodiment. Then during printing, the controller 45 also identifies the density level of a page. Following the monitoring step, the controller then compares the cooldown time just monitored with the compiled set of times for a density level corresponding to the print density level just used. This scheme of dividing the set of compiled cooldown times into subsets according to prim density removes any variation attributable to area of fill as a variable in the method. In the example of FIG. 3, the threshold for signaling an out of ink condition may be around a 1.8 second cooldown time, as compared to an initial set of cooldown times compiled as being around between 1.2 seconds for the first portion of curve 90. It is apparent that the signaling threshold may be varied for other margins of comfort, such as 2.2 seconds for a narrower margin.

When comparing monitored cooldown temperatures with a set of times compiled near the start of pen use, it is apparent that the system should be able to recognize when a new pen has been installed in the printer 20, so a new set of values may be compiled. This recognition step is easily implemented using current pen designs. For instance, the illustrated black cartridge 60 has a 8-bit serial number electronically encoded into each pen. Unfortunately, this limit the total number of possible serial numbers to 256. To distinguish whether the same pen has been reinserted into the carriage, or a new pen which coincidentally happens to have the same serial number, the printheads are also equipped with a ten-power identity resistor. The controller 45 reads not only the 8-bit serial number but also the identity resistor and stores these values for comparison when the pen is removed and then the controller sees a "new" pen being installed. The controller compares the identifying dan of the "new" pen to determine whether a fresh pen or the old pen has been installed. Identification of a new pen may be used to clear the old pen values and begin compiling new sets of cooldown times. Alternatively, it may be preferable to replace the old values one at a time as the new pen is being used, allowing the old data to serve as a baseline for comparison until new reference data is generated.

Figure 4:
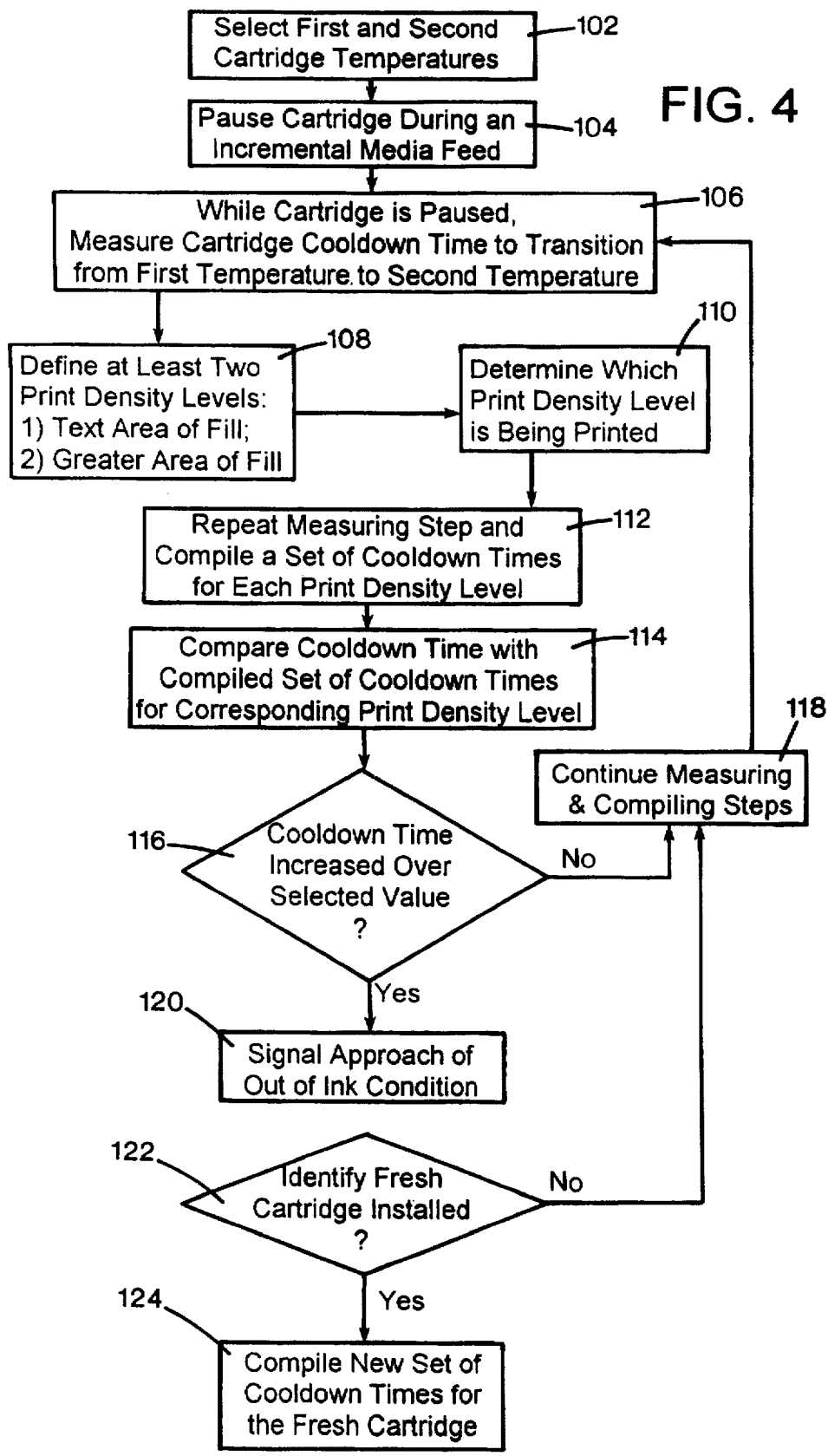
FIG. 4 is a flow chart of one form of a cooldown time monitoring system of the present invention.

In summary, FIG. 4 shows a flow chart 100 of the cooldown time monitoring system constructed and operated in accordance with the present invention. As described above, the first and second cartridge temperatures are selected in step 102. During an incremental media feed of sheet 34 by the media handling system 26, the cartridge 60, 62 is paused in step 104, for measuring the cooldown time required for the cartridge 60, 62 to transition from the first temperature to the second temperature in step 106. Two optional steps 108 and 110 may then be performed to accommodate different print density levels, first defining at least two print density levels in step 108, and then determining which print density level is being printed in step 110. Following step 110, or if optional steps 108 and 110 are omitted then following step 106, comes a step 112 of repeating the measuring step and compiling each cooldown time measured during each performance of the measuring step into a set of cooldown times (for each print density level if steps 108 and 110 are employed). Thereafter in a comparing step 114, the cooldown time is compared with the set of compiled cooldown times (for the corresponding print density level if steps 108 and 110 are employed), to find whether the cooldown time has increased over a selected value in step 116. If not, then step 118 allows continuation of the measuring and compiling steps 106, optionally steps 108 and 110, and steps 112–116. If the cooldown time has increased over a selected value in step 116, the step 120 signals the approach of an out of ink condition. As described above, identification of the installation of a fresh cartridge in step 122 is helpful, and when not detected, then step 118 allows continuation of the measuring and compiling steps. When a fresh cartridge is identified by step 122 as having been installed, then step 124 comprises compiling a new set of cooldown times for the fresh cartridge.

Advantages

This system advantageously allows the monitoring of ink levels within the pen, without expending any additional ink through spitting. Moreover, this system provides an early warning detection of an eminent out-of-ink condition approaching. This early warning allows an operator to refill the current cartridge or procure a fresh cartridge, before printing actually ceases. It is apparent that this system may be used either with pigment based inks, such as in black cartridge 60, or with dye based inks, as in the color cartridge 62, or other types of ink known to those skilled in the art. This cooldown time monitoring concept advantageously uses the heat sinking property of the cool ink remaining within the cartridge reservoir. With less ink remaining in the cartridge 60, 62, the speed with which the remaining ink dissipates heat increases.

Some of the earlier level detection systems found drop volume decreases at higher printing frequencies, on the order of 12 kHz, but not at lower firing frequencies. The method described herein provides results at both high and the lower firing frequencies. It is believed that the pen cooldown time method relates to flow refill rates within the printhead, which are also related to backpressure changes within the cartridge, rather than drop volume changes.

It is apparent that this cooldown time monitoring system may also be used during other scheduled tests, such as when test patterns are spit into the spittoon. However, by selecting the cooldown temperatures to generate cooldown times within the time period of a non-printing mode, such as about two seconds for monitoring during a form feed operation of printer 20, no printing time is lost during routine monitoring. This technique advantageously accomplishes ink level monitoring without decreasing throughput, i.e., a printer specification rating given in terms of pages per minute.

I claim:

1. A method of monitoring the ink level remaining in an inkjet cartridge installed in an inkjet printing mechanism, comprising the steps of:

pausing the inkjet cartridge during a printing operation;

during the pausing step, measuring the cooldown time required for the cartridge to transition from a first temperature to a second temperature;

repeating the measuring step and compiling each cooldown time measured during each performance of the measuring step into a set of cooldown times; and signaling the approach of an out of ink condition when a cooldown time has increased a selected value over the compiled set of cooldown times.

2. A method according to claim 1, wherein;

the measuring step comprises the step of measuring the cooldown time of a printhead of the inkjet cartridge, with said first temperature and said second temperature each comprising temperatures of the printhead.

3. A method according to claim 1, wherein said second temperature of the cartridge in the measuring step is greater than an ambient temperature.

4. A method according to claim 1, wherein the first and second temperatures of the cartridge in the measuring step are based upon an actual operating temperature of the printing mechanism.

5. A method according to claim 1, wherein the pausing step comprises the step of pausing the inkjet cartridge during a media feed printing operation where a sheet is advanced through the printing mechanism between printing passes of the cartridge.

6. A method according to claim 5, wherein:

the media feed printing operation of the pausing step occurs during a first time span; and the first and second temperatures of the measuring step provide a cooldown time less than the first time span.

7. A method according to claim 1, wherein:

when a fresh inkjet cartridge is installed in the printing mechanism, the method further includes the step of identifying said fresh cartridge; and in response to the identifying step, the compiling step comprises the step of compiling a new set of cooldown times for the fresh cartridge.

8. A method according to claim 1, wherein the signaling step comprises the step of signaling the approach of an out of ink condition when a cooldown time has increased a selected value of at least 20% over the compiled set of cooldown times.

9. A method according to claim 1, wherein:

the method further includes the steps of defining at least two print density levels, and determining which print density level is being printed;

the compiling step comprises the step of compiling a set of cooldown times for each print density level; and the signaling step comprises the step of signaling the approach of an out of ink condition when a cooldown time has increased a selected value over the compiled set of cooldown times for the print density level corresponding to the determined print density level which is being printed.

10. A method according to claim 9, wherein the defining step comprises the step of defining print density levels at an area of fill corresponding to printing textual matter, and at a greater area of fill than that of the area of fill for printing textual matter.

11. A method according to claim 9, wherein the defining step comprises the step of defining print density levels at an area of fill corresponding to printing textual matter, and at two or more areas of fill corresponding to about twice, about four times, and about six times that of the area of fill for printing textual matter.

12. An inkjet printing mechanism for printing with an inkjet cartridge, comprising:

a moveable carriage to receive the inkjet cartridge;

a temperature sensor to collect information about the cartridge temperature;

a controller responsive to the temperature sensor to measure a cooldown time required for the cartridge to transition between selected first and second temperatures, and to compile therefrom a set of cooldown times from subsequent measurements; and a signal device responsive to the controller to alert an operator of an a approaching out of ink condition when a cooldown time has increased a selected value over the compiled set of cooldown times.

13. An inkjet printing mechanism according to claim 12 wherein the controller measures the cooldown time when carriage movement is paused during a printing operation.

14. An inkjet printing mechanism according to claim 13 wherein:

the printing mechanism further includes a media handling system for incrementally advancing a media sheet through a printzone; and a said printing operation, during which said carriage movement is paused and the controller measures the cooldown time, comprises an incremental advance of the media sheet by the media handling system through the printzone.

15. An inkjet printing mechanism according to claim 14 wherein:

the incremental advance of the media sheet occurs during a first time span; and the first and second temperatures are selected so a cooldown time is less than the first time span.

16. An inkjet printing mechanism according to claim 12 wherein the inkjet cartridge has a printhead with a temperature measuring device contained therein to measure the printhead temperature, and the temperature sensor collects temperature information from said temperature measuring device to measure the cooldown time of the printhead.

17. An inkjet printing mechanism according to claim 12 wherein:

the cartridge includes an identification code; and the controller is responsive to the cartridge identification code to sense the presence of a fresh cartridge to begin to compile a new set of cooldown times for the fresh cartridge.

18. An inkjet printing mechanism according to claim 12 wherein the selected value comprises a value of at least 20% over the compiled set of cooldown times.

19. An inkjet printing mechanism according to claim 12 wherein the selected value comprises a value of 25–50% over the compiled set of cooldown times.

20. An inkjet printing mechanism according to claim 12 wherein:

the inkjet cartridge has a printhead with a temperature measuring device contained therein to measure the printhead temperature, and the temperature sensor collects temperature information from said temperature measuring device to measure the cooldown time of the printhead;

the printing mechanism further includes a media handling system for incrementally advancing a media sheet through a printzone;

said printing operation during which said carriage movement is paused and the controller measures the cooldown time, comprises an incremental advance of the media sheet by the media handling system through the printzone, with the incremental advance of the media sheet occurring during a first time span;

the first and second temperatures are selected so a cooldown time is less than the first time span;

the cartridge includes an identification code; and the controller is responsive to the cartridge identification code to sense the presence of a fresh cartridge to begin to compile a new set of cooldown times for the fresh cartridge.

* * * * *